US 12,044,275 B2

(12) United States Patent
Tenca et al.

(10) Patent No.: US 12,044,275 B2
(45) Date of Patent: Jul. 23, 2024

(54) SHAFT-HUB CONNECTION SYSTEM WITH ANGULAR PLAY FOR THE BIDIRECTIONAL TRANSMISSION OF DRIVING TORQUE

(71) Applicant: COMER INDUSTRIES S.P.A., Reggiolo (IT)

(72) Inventors: Gianni Tenca, Viadana (IT); Andrea Burato, Carpi (IT); Massimo Tondelli, Campagnola Emilia (IT)

(73) Assignee: COMER INDUSTRIES S.P.A., Reggiolo (IT)

( * ) Notice: Subject to any disclaimer, the term of this patent is extended or adjusted under 35 U.S.C. 154(b) by 487 days.

(21) Appl. No.: 17/420,426

(22) PCT Filed: Nov. 25, 2019

(86) PCT No.: PCT/EP2019/082459
§ 371 (c)(1),
(2) Date: Jul. 2, 2021

(87) PCT Pub. No.: WO2020/143954
PCT Pub. Date: Jul. 16, 2020

(65) Prior Publication Data
US 2022/0082132 A1 Mar. 17, 2022

(30) Foreign Application Priority Data
Jan. 8, 2019 (IT) .......................... 102019000000145

(51) Int. Cl.
*F16D 3/38* (2006.01)
*F16D 41/16* (2006.01)

(52) U.S. Cl.
CPC ............. *F16D 3/387* (2013.01); *F16D 41/16* (2013.01)

(58) Field of Classification Search
CPC ........ F16B 7/042; F16B 21/065; F16B 21/10; F16B 21/125; F16B 21/16; F16D 1/06;
(Continued)

(56) References Cited

U.S. PATENT DOCUMENTS

| 1,452,316 A | * | 4/1923 | Shirley | ................... F16D 41/18 |
| | | | | 74/650 |
| 2,014,383 A | * | 9/1935 | Baker | ..................... F16D 41/12 |
| | | | | 192/48.1 |

(Continued)

FOREIGN PATENT DOCUMENTS

| CH | 643 635 A5 | 6/1984 |
| CN | 1732104 A | 2/2006 |

(Continued)

OTHER PUBLICATIONS

Chinese Office Action dated Jul. 21, 2023 received in Chinese Patent Application No. 201980088296.8.

(Continued)

*Primary Examiner* — Josh Skroupa
(74) *Attorney, Agent, or Firm* — Scully, Scott, Murphy & Presser, P.C.

(57) ABSTRACT

A shaft-hub connection system with angular play for bidirectional transmission of driving torque, comprising a shaft, a hub provided with a hole inside which the shaft is accommodated, and elements for connection which are interposed between the hub and said shaft. The connection elements comprise at least one functional assembly which comprises a slot in which a corresponding coupling element is accommodated so that it can move and is adapted to assume alternately a first position, in which it is retracted within the slot, a second position, in which it protrudes partially with respect to it along a first orientation, and a third position, in which it protrudes partially with respect to it along a second orientation, elastic compression elements (Continued)

interposed between the slot and the coupling element, a first seat and a second seat for the abutment of the coupling element.

11 Claims, 10 Drawing Sheets

(58) Field of Classification Search
CPC ........ F16D 1/0852; F16D 1/087; F16D 1/108; F16D 1/112; F16D 1/12; F16D 3/387; F16D 7/048; F16D 41/12; F16D 41/16; F16D 41/18; F16D 43/2028; F16D 2001/062; Y10T 403/602; Y10T 403/604
USPC .................................. 464/160; 403/327, 328
See application file for complete search history.

(56) References Cited

U.S. PATENT DOCUMENTS

| | | | |
|---|---|---|---|
| 2,784,820 A | 3/1957 | Clark | |
| 3,249,185 A | 5/1966 | Moorhead | |
| 3,433,329 A * | 3/1969 | Koudelka | F16D 41/16 188/82.2 |
| 4,058,192 A * | 11/1977 | Haigh | F16D 41/18 192/46 |
| 8,083,042 B2 * | 12/2011 | Samie | F16D 41/16 192/43.1 |
| 9,217,475 B2 * | 12/2015 | Brunazzi | F16D 43/2028 |
| 10,704,616 B2 * | 7/2020 | Hsieh | F16D 41/12 |
| 11,225,972 B2 * | 1/2022 | Davis | F16D 41/12 |
| 2004/0188219 A1 | 9/2004 | Wians | |
| 2008/0110715 A1 * | 5/2008 | Pawley | F16D 41/12 192/43.1 |

FOREIGN PATENT DOCUMENTS

| | | | | |
|---|---|---|---|---|
| CN | 102530052 A | 7/2012 | | |
| CN | 104514819 A | 4/2015 | | |
| CN | 105190104 A | 12/2015 | | |
| CN | 105324586 A | 2/2016 | | |
| CN | 105393024 A | 3/2016 | | |
| CN | 205478970 U | 8/2016 | | |
| DE | 102013222783 A1 * | 5/2014 | ............ | F16D 41/16 |
| EP | 0539883 A2 * | 5/1993 | ............ | F16D 41/12 |
| EP | 0 870 944 A1 | 10/1998 | | |
| GB | 2296308 A | 6/1996 | | |
| JP | 58005537 A * | 1/1983 | ............ | F16D 41/12 |
| JP | 6546083 B2 * | 7/2019 | ............ | F16D 41/12 |
| RU | 2 514 412 C2 | 12/2010 | | |

OTHER PUBLICATIONS

International Search Report and Written Opinion dated Dec. 19, 2019 issued in PCT/JP2019/082459.
Italian Search Report and Written Opinion dated Jun. 3, 2019 issued in IT 201900000145.
Russian Search Report dated Aug. 29, 2022 received in Russian Application No. 2021122727/11 (047439).

* cited by examiner

SHAFT-HUB CONNECTION SYSTEM WITH ANGULAR PLAY FOR THE BIDIRECTIONAL TRANSMISSION OF DRIVING TORQUE

The present invention relates to a shaft-hub connection system with angular play for the bidirectional transmission of driving torque.

Shaft-hub connection systems are known which allow the bidirectional transmission of the driving torque in the two directions of rotation about the longitudinal axis of the shaft, but with a limited angular play between the shaft and the hub.

Particularly but not exclusively with reference to the farming machine sector, these connection systems are used typically in universal shafts for the transmission of the driving torque from the driving shaft of the power takeoff of a tractor to the transmission shaft of a power-using machine to be actuated. These systems, known as "free rotation" systems, allow to have a certain angle of free relative rotation between the ends of the universal shaft, so as to facilitate its installation, compensating any angular offsets between the driving shaft and the transmission shaft, considering that the coupling of these shafts with the corresponding universal joints is generally of the splined or in any case side-fit type. When the power takeoff of the tractor starts, regardless of its direction of rotation, after moving through a limited angle of free rotation, these connection systems allow the transmission of the driving torque to the power-using machine in both directions of rotation.

There are various types of connection system for this kind of application which differ essentially in the elements of the universal shaft between which the components of said system are interposed.

In particular, connection systems of the type described above are known which are arranged at the external fork of one of the two terminal universal joints, which is intended, in use, to be coupled to the driving shaft of the tractor or to the driven shaft of the power-using machine.

A solution of this kind is known for example from patent application GB2296308A, which describes a connection system which comprises a sleeve-like female element, which acts as a hub and is connected to an external fork of the universal shaft, inside which a cylindrical male element is supported in rotation about the corresponding longitudinal axis, acts as a shaft and, in use, is adapted to be coupled to the driving shaft of the tractor or to the transmission shaft of the power-using machine.

A first group of tabs and a second group of tabs, respectively, are interposed between the shaft and the hub for the transmission of the driving torque in a first direction of rotation and in a second direction of rotation about the longitudinal axis. The tabs of the first and second groups are accommodated so that they can move in respective slots formed on the outer side wall of the shaft and are adapted to engage corresponding abutment seats formed in the internal wall of the hub.

The orientation of the transverse cross-section of the abutment seats for the tabs of the first and second groups with respect to the main shaft is mutually opposite.

Elastic compression means are interposed between each tab and the bottom of the respective slot and act on said tab at a lateral end with respect to an imaginary plane that passes through the longitudinal axis of the shaft and the centerline of said slot.

For the tabs of the first and second groups, the arrangement of the respective elastic means within the corresponding slots is mutually opposite.

Each tab therefore can move between a first position and a second position with respect to the corresponding slot.

In the first position, the tab is completely accommodated within the respective slot, compressing the elastic means, so as to not interfere with the hub and allow the free relative rotation between the shaft and said hub.

In the second position, due to the thrust applied by the elastic means, the tab performs a movement with respect to said imaginary plane, until it is arranged so as to protrude partially from the corresponding slot in order to engage the corresponding abutment seat on the hub and allow the transmission of the torque in a first or second direction of rotation.

The system can thus assume different configurations, including a free rotation configuration in which the tabs of the first and second groups are in the first position so as to allow free relative rotation between the shaft and the hub, a first active configuration in which the tabs of the first group engage the respective abutment seats for the transmission of the driving torque in a first direction of rotation and the tabs of the second group are in the first position, and a second active configuration in which the tabs of the second group engage the respective abutment seats for the transmission of the driving torque in a second direction of rotation and the tabs of the first group are in the first position.

These connection systems of the known type are not free from drawbacks, which must include the fact that for the bidirectional transmission of the driving torque they need to have, for each direction of rotation about the main axis, a dedicated group of tabs with a particular shape and a particular arrangement of the corresponding elastic means and a corresponding group of abutment seats having an appropriate shape.

These systems of the known type therefore have a complex structure, with the need to provide a considerable number of components which must be assembled according to particular operating methods and therefore entail high production costs in addition to a significant risk of obtaining defective parts to be reworked.

Furthermore, the need to provide two distinct groups, one for each direction of rotation, of tabs with the corresponding slots and abutment seats, which must be distributed on the transverse cross-section of the system, entails the need to provide an adequate sizing of the shaft and of the hub as the driving torque to be transmitted varies, and therefore as the torque increases there is a considerable increase in the transverse space occupation of the system.

The aim of the present invention is to eliminate the drawbacks noted above of the background art, providing a shaft-hub connection system with angular play for the bidirectional transmission of driving torque that allows to reduce the number of components, to simplify its structure and to facilitate the assembly operations, so as to contain production costs and reduce the risk of obtaining manufacturing rejects.

Within this aim, an object of the present invention is to allow, with respect to known solutions, a reduction of the transverse space occupations for an equal torque to be transmitted or to increase the transmitted torque for equal transverse space occupations.

A further object of the present invention is to allow it to be incorporated easily in universal transmission assemblies for farming machines.

Another object of the present invention is to have a structure that is simple, relatively easy to provide in practice, safe in use, effective in operation, and relatively low in cost.

This aim and these objects are all achieved by the present shaft-hub connection system with angular play for the bidirectional transmission of driving torque, comprising a shaft extended along a main axis, a hub provided with a hole inside which said shaft is at least partially accommodated and means for connection with predefined angular play which are interposed between said hub and said shaft for the bidirectional transmission of the driving torque about said main axis and are adapted to alternately assume at least one configuration for free relative rotation between the shaft and the hub about the main axis, a first active configuration for transmission of the torque between the shaft and the hub in a first direction about the main axis and a second active configuration for transmission of the torque between the shaft and the hub in a second direction, which is opposite with respect to the first one, about said axis, these configurations being angularly mutually offset about the main axis, characterized in that said connection means comprise at least one functional assembly which comprises a slot associated with the outer side wall of said shaft in which a corresponding coupling element is accommodated so that it can move and is adapted to assume alternately a first position, in which it is retracted within said slot, a second position, in which it protrudes partially with respect to it along a first orientation, and a third position, in which it protrudes partially with respect to it along a second orientation, elastic compression means interposed between said slot and said coupling element for the movement of said element from the first position to the second or third position, a first seat and a second seat for the abutment of said coupling element, respectively in the second and third positions which are associated inside the hole of said hub and are angularly offset about said main axis, in the first position the coupling element being completely accommodated within the slot in order to maintain the configuration for free relative rotation and in the second or third position the coupling element protruding partially from said slot in order to engage respectively the first seat in the first active configuration or the second seat in the second active configuration.

Further characteristics and advantages of the present invention will become better apparent from the detailed description of some preferred but not exclusive embodiments of a shaft-hub connection system with angular play for the bidirectional transmission of driving torque, illustrated by way of nonlimiting example in the accompanying drawings, wherein.

With reference to the above figures, the reference numeral 1 generally designates a shaft-hub connection system with angular play for the bidirectional transmission of driving torque.

The expression "bidirectional transmission" refers to the possibility to transmit driving torque in both directions of rotation about the rotation axis.

The system 1 comprises a shaft 2 which is extended along a main axis A. The shaft 2 can be provided with an axial hole 3 for connection to a driving or transmission element, not shown.

It is not excluded that the shaft 2 might be solid and might have a different coupling to the driving or transmission element.

The system 1 further comprises a hub 4 provided with a hole 5 inside which the shaft 2 is accommodated at least partially. In use, the hub 4 is adapted to be connected to a transmission or driving element, not shown.

The hole 5 is extended along the main axis A and may be blind or may pass through the hub 4.

The shaft 2 can be inserted so as to pass through the hole 5 or so that one of its ends is accommodated within said hole.

Furthermore, the system 1 comprises connection means 6 with predefined angular play, which are interposed between the hub 4 and the shaft 2 for the bidirectional transmission of the driving torque about the main axis A.

Such connection means 6 are adapted to assume alternately at least one configuration for free relative rotation between the hub 4 and the shaft 2 about the main axis, a first active configuration for transmission of torque between the shaft 2 and the hub 4 in a first direction about the main axis A and a second active configuration for transmission of torque between the shaft 2 and the hub 4 in a second direction, which is opposite the first one, about said axis, these configurations being angularly mutually offset about the main axis A.

The clockwise or counterclockwise direction with respect to the figures in which the driving torque is transmitted about the main axis A in the first and second operating configurations depends, on the basis of the specific application of the system 1, on which between the shaft 2 and the hub 4 is connected to the driving element of the kinematic chain.

The connection means 6 comprise at least one functional assembly 7, which comprises a slot 8 which is associated with the outer side wall of the shaft 2 in which a corresponding coupling element 9 is movably accommodated and is adapted to assume alternately a first position, in which it is retracted within the slot 8, a second position, in which it protrudes partially with respect to it according to a first orientation, and a third position, in which it protrudes partially with respect to it according to a second orientation, elastic compression means 10 interposed between the slot 8 and the coupling element 9 for the movement of said element from the first position to the second or third position, a first seat and a second seat 11 and 12 for the abutment of the coupling element 9, respectively in the second and third positions, which are associated inside the hole 5 of the hub 4 and are angularly offset about the main axis A.

The seats 11 and 12 are arranged at a same transverse cross-section with respect to the main axis of the hub 4 but in angular positions which are distinct with respect to said axis.

Preferably, the slot 8 is provided directly in the shaft 2 and the seats 11 and 12 are formed directly in the hub 4.

In the first position (FIG. 3), the coupling element 9 is adapted to maintain the configuration for free relative rotation between the shaft 2 and the hub 4.

In the second position (FIGS. 1, 2, 5, 6), the coupling element 9 is adapted to engage the first seat 11 in the first active configuration for the transmission of the driving torque in the first direction about the main axis A.

In the third position (FIG. 4), the coupling element 9 is adapted to engage the second seat 12 in the second active configuration for the transmission of the driving torque in the second direction about the main axis A.

The coupling element 9 comprises a first surface 13 which is directed toward the bottom of the slot 8 and is delimited in a longitudinal direction by two mutually opposite edges 14 which are substantially parallel to the main axis A. The first surface 13 is preferably flat but it is not excluded that it might be shaped differently.

Preferably, on at least one plane that is substantially perpendicular to the main axis, the elastic means 10 act on the coupling element 9 at least at a central portion 13a of the first surface 13 which is comprised between the two mutually opposite edges 14 and is spaced therefrom.

The term "substantially" is understood to mean except for ordinary machining or assembly tolerances.

Differently from known solutions, in which the elastic means act at one of the end portions of the coupling element, according to the invention the elastic means 10 act, or in any case concentrate their thrusting action, at at least one central portion 13a of the first surface 13 of the coupling element 9 which is spaced from the edges 14.

Preferably, the slot 8 has a plane of symmetry P which passes through the main axis A.

In a preferred embodiment, in the first position of the coupling element 9 the elastic means 10 act, or in any case concentrate their action, on at least one central portion 13a of the first surface 13 of said element which is arranged proximate to or at said plane of symmetry P.

Furthermore, the slot 8 comprises two side walls 15 which are arranged symmetrically with respect to the plane P and the coupling element 9 comprises a first face and a second face, respectively, 16 and 17 which are mutually opposite, each facing a corresponding side wall 15 of the slot.

In the first active configuration, the coupling element 9 in the second position is arranged so that the first face 16 rests on the corresponding side wall 15 and the second face 17 is spaced from the corresponding side wall 15.

In the second active configuration, the coupling element 9 in the third position is arranged so that the first face 16 is spaced from the corresponding side wall 15 and the second face 17 arrests on the corresponding side wall 15.

In a preferred embodiment, the faces 16 and 17 are mutually parallel and the side walls 15 diverge in the direction away from the main axis A.

Furthermore, the coupling element 9 comprises a second surface 18, which is arranged opposite the first surface 13 and faces internally the hole 5. The surfaces 13 and 18 are interposed between the faces 16 and 17. The second surface 18 is preferably flat, but it is not excluded that it might be shaped differently.

With reference to a sectional plane that is substantially perpendicular to the main axis A, the cross-section of the first seat 11 comprises at least one portion for the abutment of a part of the second face 17 of the coupling element 9 in the second position for the transmission of the driving torque in the first direction about the main axis A in the first active configuration, while the cross-section of the second seat 12 comprises at least one portion for the abutment of a part of the first face 16 of the coupling element 9 in the third position for the transmission of the driving torque in the second direction about the main axis A in the second active configuration.

Preferably, the cross-section of the first seat 11 comprises respective portions for the abutment of a part of the second face 17 and of the second surface 18 of the coupling element 9 in the second position, while the cross-section of the second seat 12 comprises respective portions for the abutment of a part of the first face 16 and of the second surface 18 of the coupling element 9 in the third position.

It is not excluded, in any case, that the portions of the seats 11 and 12 that face the second surface 18 of the coupling element 9, respectively, in the second and third positions might be shaped so as to not mate with said surface.

The shape of the seats 11 and 12 is such as to facilitate the engagement and disengagement of the coupling element 9 with respect to said seats as a function of the direction of relative rotation between the shaft 2 and the hub 4.

Preferably, the coupling element 9 comprises a body shaped like a parallelepiped, such as a tab.

Usefully, the system 1 can have two or more functional assemblies 7, each of which comprises a respective slot 8 for the accommodation of a corresponding coupling element 9, respective elastic means 10, respective first and second abutment seats 11 and 12. Said functional assemblies 7 are angularly mutually offset about the main axis A. The functional assemblies 7 are preferably distributed with a uniform angular pitch about the main axis A.

The offset angle between the seats 11 and 12 of each functional assembly 7 defines the maximum angular play provided in the free relative rotation between the shaft 2 and the hub 4 before assuming the first or second active configuration for transmission of the driving torque.

Figure 1:
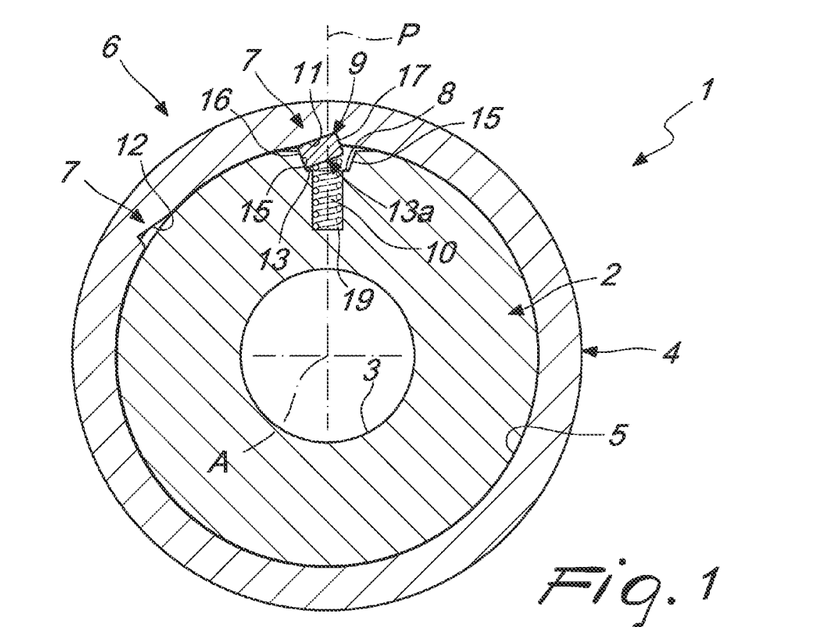
FIG. 1 is a schematic sectional view, taken at right angles to the main axis, of a first embodiment of a shaft-hub connection system with angular play for the bidirectional transmission of driving torque according to the invention, comprising a single functional assembly shown in the first active configuration.
Figure 1A:
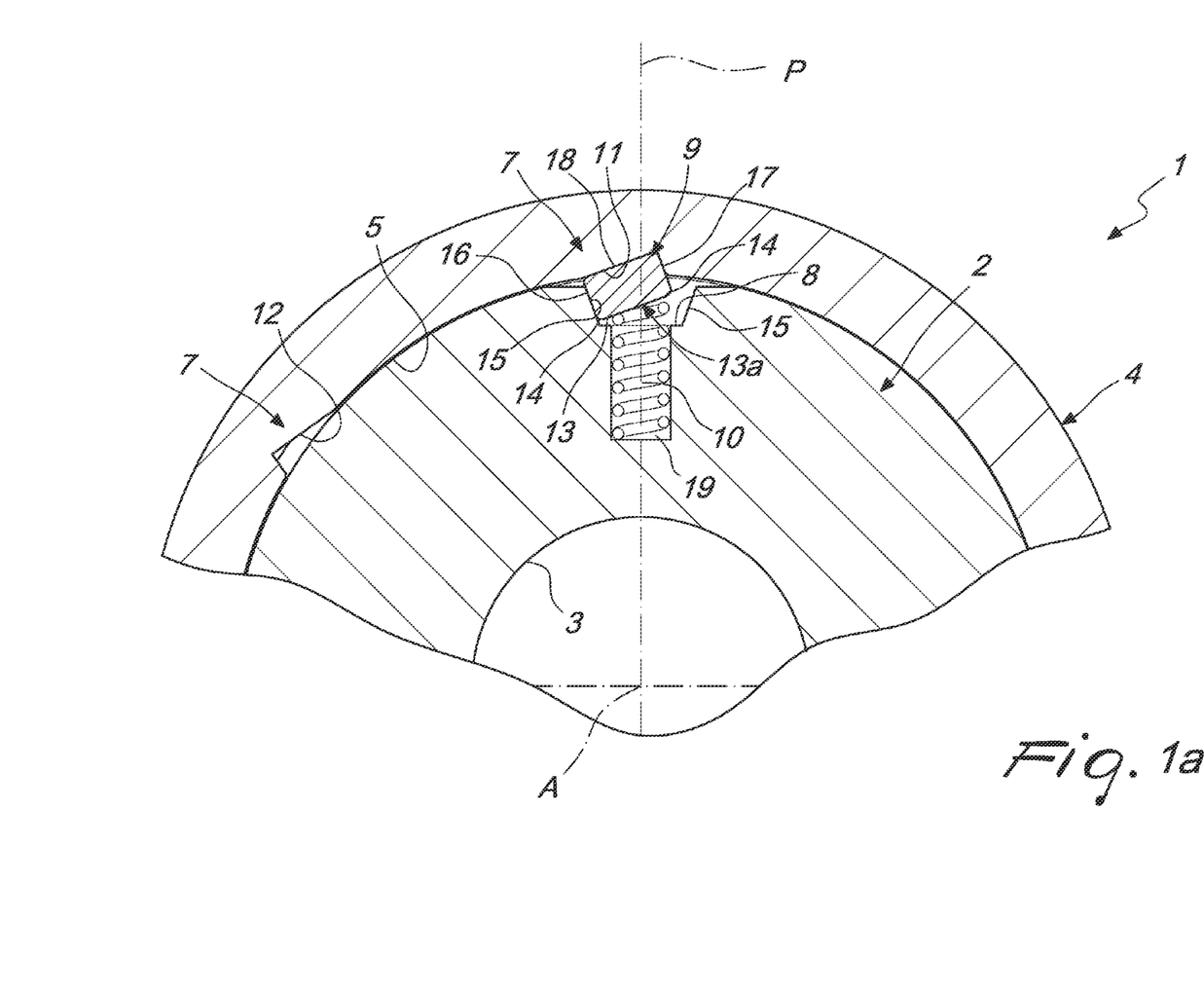
FIG. 1a is an enlarged-scale view of a portion of FIG. 1 at the corresponding functional assembly.

FIG. 1 shows a first embodiment of the system 1 provided with a single functional assembly 7.

In this case there is a maximum angular play between the shaft 2 and the hub 4 that is substantially equal to 60°. The maximum angular play can be varied at will by changing the relative angular position of the seats 11 and 12.

The system 1 is shown in the first active configuration, with the coupling element in the second position.

The elastic means 10 comprise at least one helical compression spring, which is partially inserted in a radially extended recess 19 which faces at the bottom of the slot 8. Along the longitudinal extension of the shaft 2, as a function of the linear extension of the coupling element 9, it is possible to distribute two or more helical springs 10 accommodated in respective recesses 19.

Figure 2:
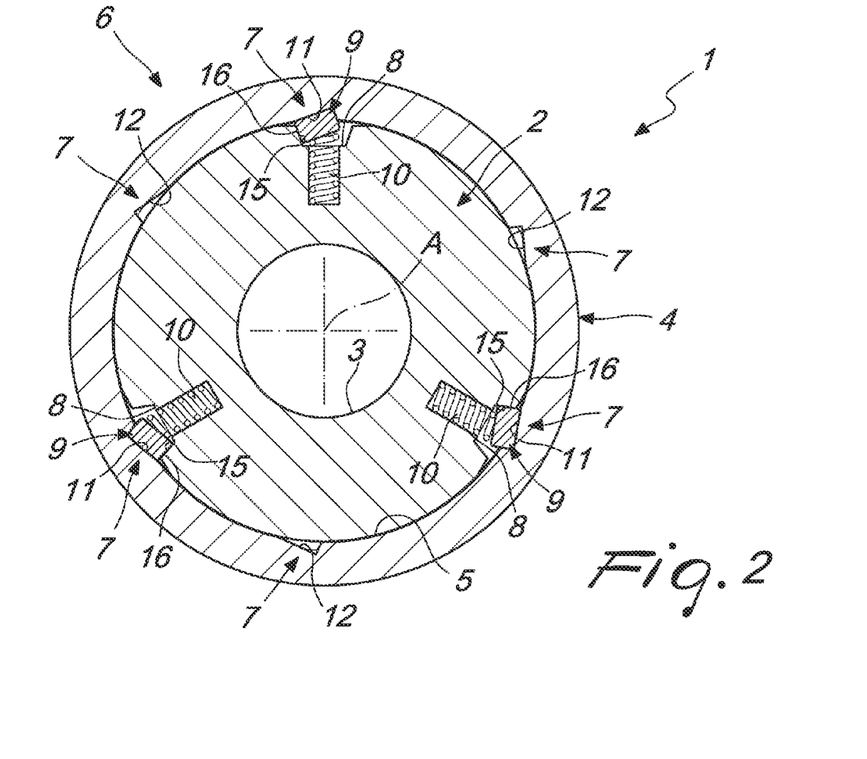
FIGS. 2-4 are schematic sectional views, taken at right angles to the main axis, of a second embodiment of the system according to the invention comprising three functional assemblies shown respectively in the first active configuration, in the free rotation configuration, and in the second active configuration.
Figure 3:
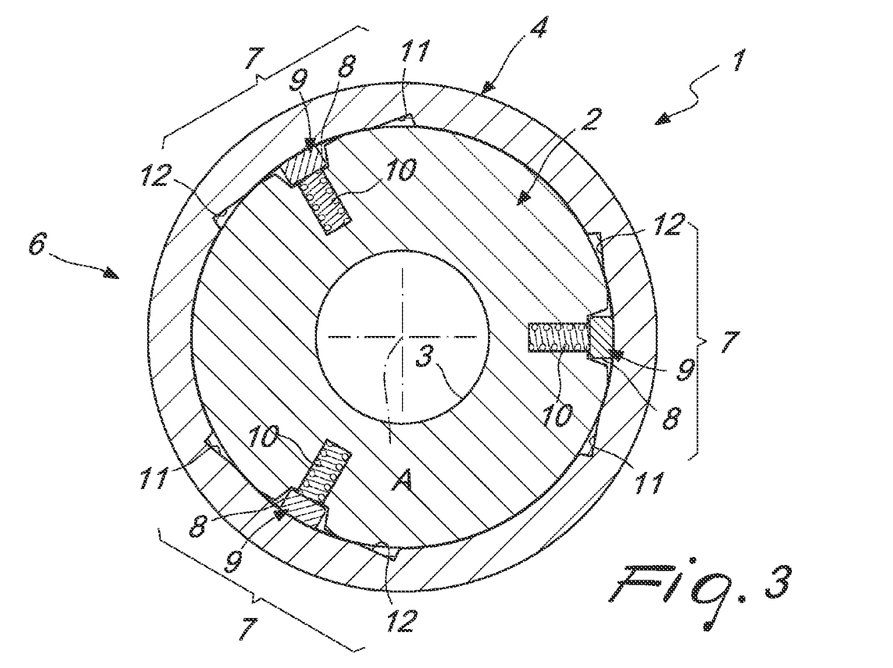
Figure 4:
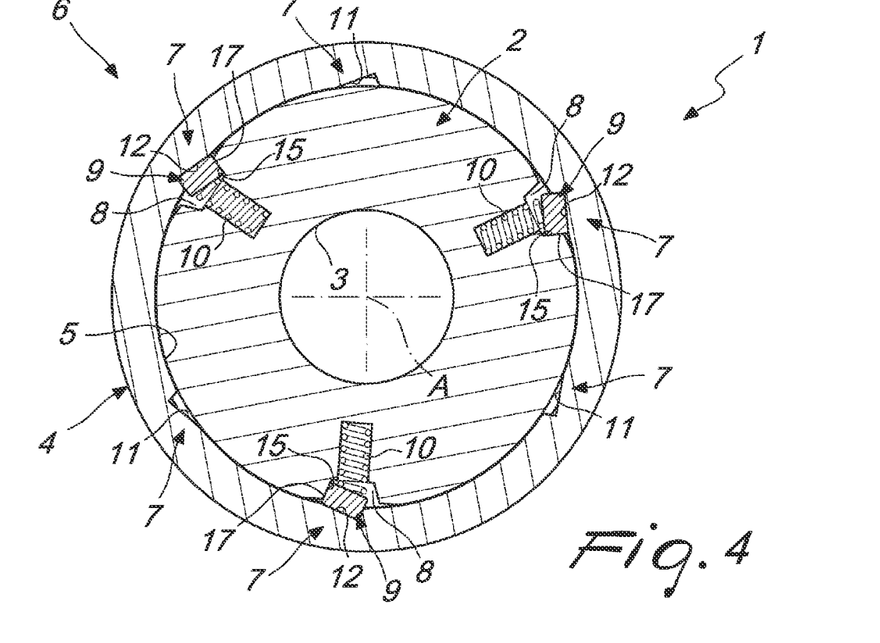

FIGS. 2-4 show a second embodiment of the system 1 in which there are three functional assemblies 7 of the type described above which are angular offset in pairs by 120°.

In this case there is a maximum angular play between the shaft 2 and the hub 4 that is substantially equal to 60°, as a function of the angular offset of the seats 11 and 12 of each functional assembly 7.

The angular play can be varied by modifying the angular offset between the seats 11 and 12 of each functional assembly 7, remaining in any case smaller than the angular pitch with which the functional assemblies 7 are distributed.

In FIG. 2, the system 1 is shown in the first active configuration, with the three coupling elements 9 in the second position and engaging the respective first seats 11.

In FIG. 3, the system 1 is shown in one of the angular configurations for free relative rotation between the shaft 2 and the hub 4, with the three coupling elements 9 in the first position, completely retracted within the corresponding slots 8 so as to compress the corresponding elastic means 10.

In FIG. 4, the system 1 is shown in the second active configuration, with the three coupling elements 9 in the third position and engaging the respective second seats 12.

Figure 5:
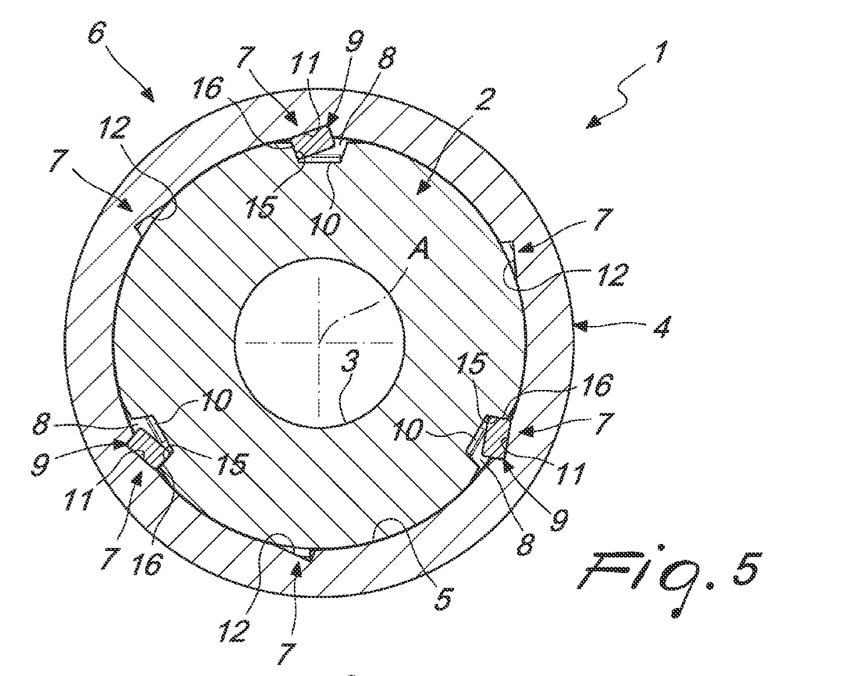
FIG. 5 is a schematic sectional view, taken at right angles to the main axis, of a third embodiment of the system according to the invention, which consists of a variation of the second embodiment according to FIGS. 2-4.

FIG. 5 shows a third embodiment of the system 1, which consists of a variation of the preceding one. In this case, the elastic means 10 of each functional assembly 7 comprise a leaf spring which is accommodated on the bottom of the corresponding slot 8 and acts on a central portion 13a of the first surface 13 of the corresponding coupling element 9.

Figure 6:
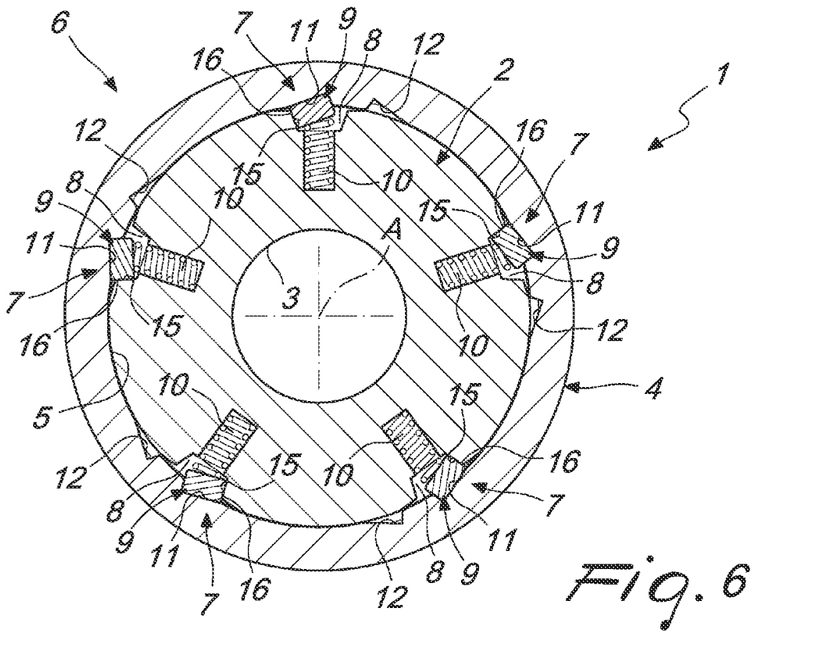
FIG. 6 is a schematic sectional view, taken at right angles to the main axis, of a fourth embodiment of the system according to the invention, comprising five functional assemblies shown in the first active configuration.

FIG. 6 shows a fourth embodiment of the system 1, which provides for five functional assemblies 7 of the type described above with helical springs 10 accommodated in respective recesses 19, angularly offset in pairs by 72°.

In this case also there is a maximum angular play between the shaft 2 and the hub 4 that is substantially equal to 60°.

Alternative embodiments in which the elastic means 10 provide for the use of elastically compressible elements which are different from helical or leaf springs, such as for example blocks made of elastically deformable plastic material, are not excluded.

It is noted that the number of functional assemblies 7 varies also as a function of the value of the driving torque to be transmitted. As this value increases, it is in fact appropriate to provide more functional assemblies 7 in order to distribute the load that acts on the coupling elements 9 in the first and second active configurations.

The system 1 according to the invention allows, for an equal transverse space occupation, to increase the value of the driving torque that can be transmitted or, for an equal driving torque to be transmitted, to reduce the transverse space occupation of said system with respect to known solutions.

The system 1 in fact provides, for each functional assembly 7, a single coupling element 9 which acts for the bidirectional transmission of the driving torque, while known systems provide two distinct groups of tabs which act for the transmission of the torque in the first and second directions about the main axis and therefore entail a greater increase in the transverse space occupation as the value of the torque to be transmitted increases.

Figure 7:
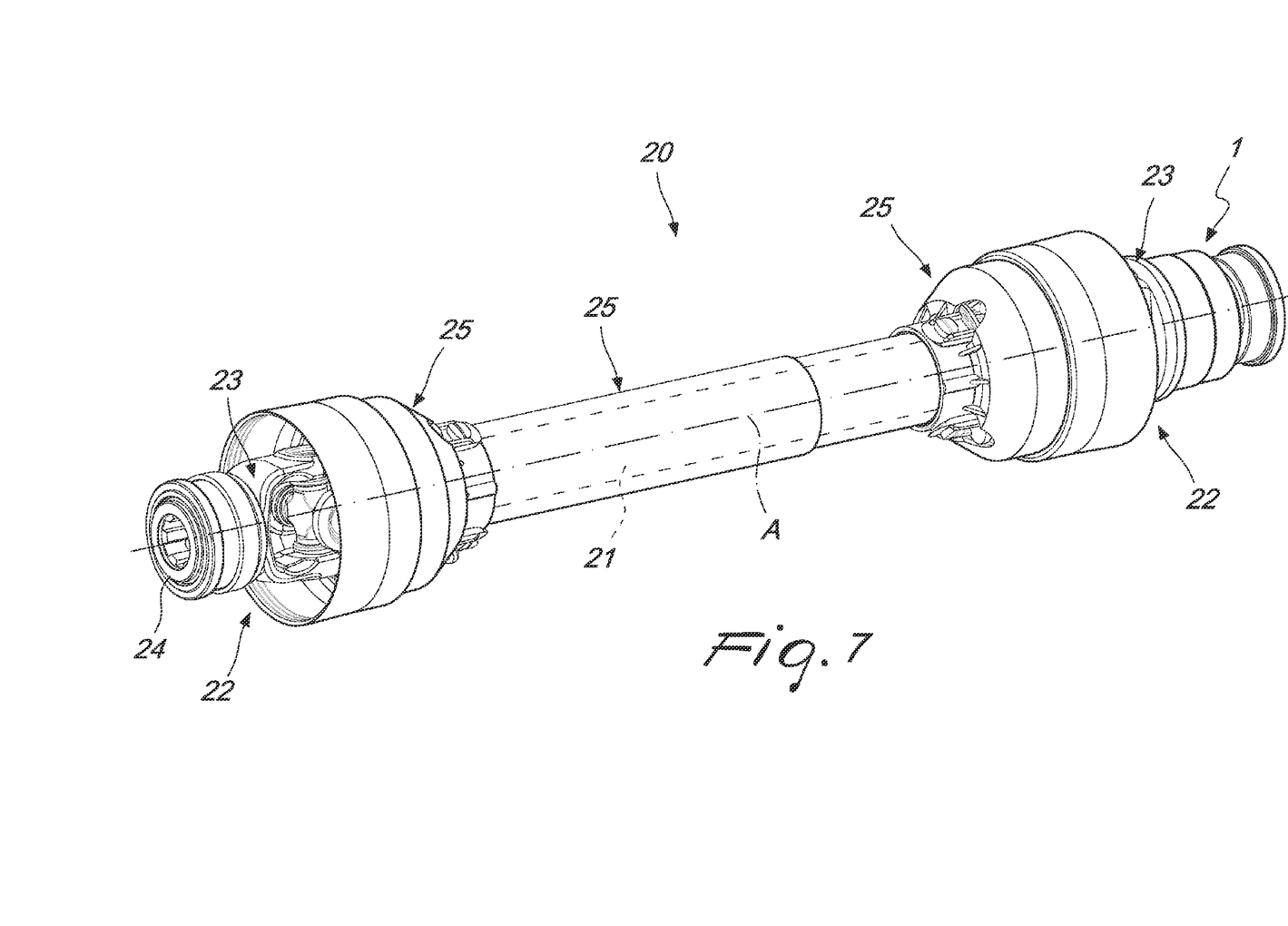
FIG. 7 is a schematic perspective view of a universal shaft comprising the connection system according to the invention.

Typically, the system 1 can be incorporated in a conventional universal transmission assembly 20 of the type that comprises a transmission shaft 21, generally of the telescopic type, the opposite ends of which are associated with respective universal joints 22, each of which comprises a respective external fork 23 which is associated with an element 24 for mating with a driving or transmission shaft, not shown.

The assembly 20 is provided with protection means 25 which are arranged externally to the transmission shaft 21 and to the universal joints 22 which are not described in detail since they are of a known type.

In the field of farming machines, for example, the assembly 20 is usually interposed between the driving shaft of the power takeoff of a tractor and the transmission shaft of a power-using machine to be operated. The presence of the system 1 incorporated in the assembly 20 allows to facilitate its installation since, by virtue of the angular play allowed between the shaft 2 and the hub 4, it is possible to compensate for initial angular offsets of the driving and transmission shafts.

The system 1 can be interposed between one of the external forks 23 and the corresponding mating element 24.

It is not excluded that the system 1 might be incorporated in the assembly 20 in a different position, such as for example between the internal fork of one of the two universal joints 22 and the corresponding end of the transmission shaft 21.

Figure 8:
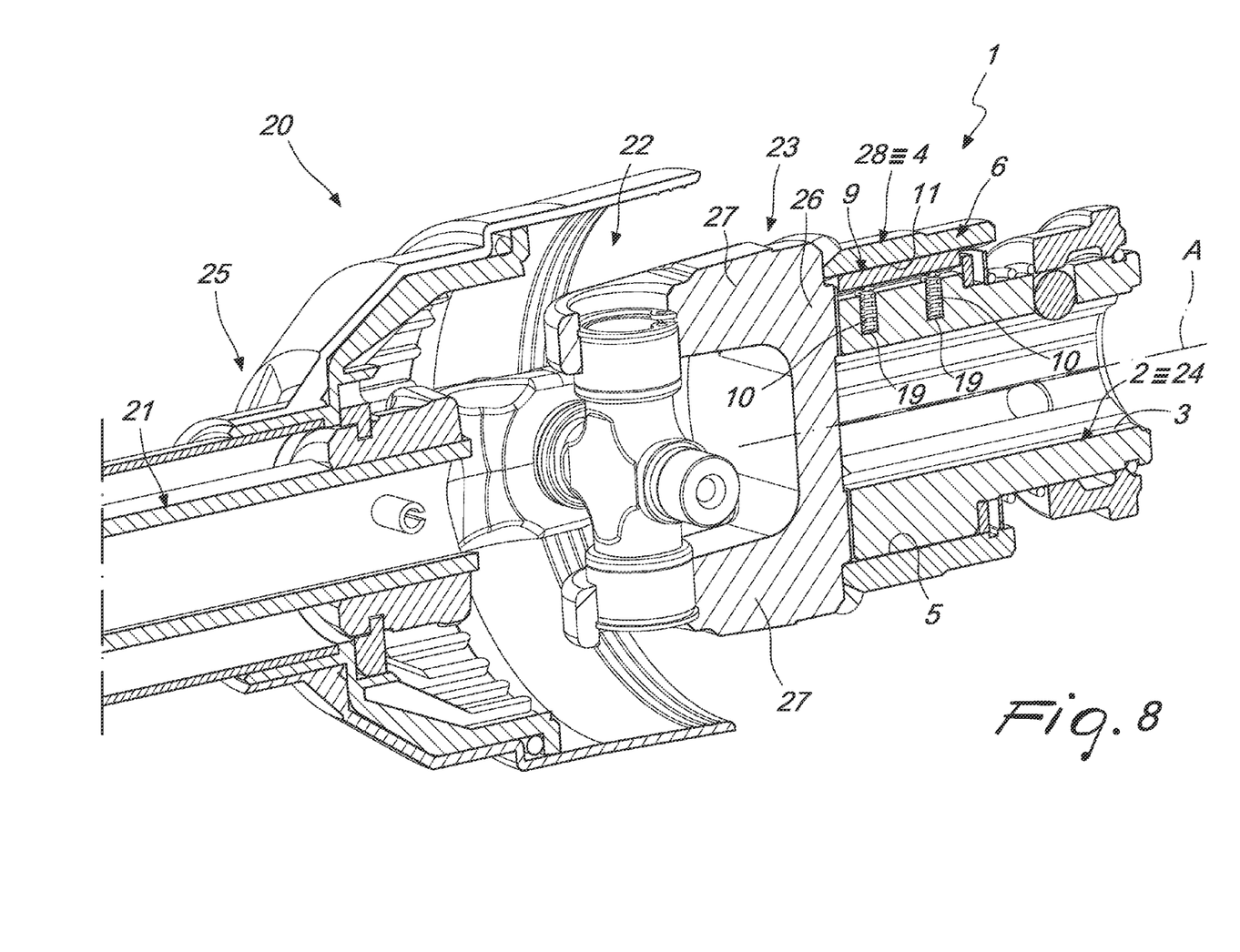
FIG. 8 is an enlarged-scale and partially sectional view of an end of the universal shaft of FIG. 7, comprising the system according to the invention.

The external fork 23 is provided with a plate 26 from which two prongs 27 protrude axially on one side and, on the opposite side, a sleeve 28 protrudes axially and forms the hub 4 of the system 1. The mating element 24 that defines the shaft 2 of the system 1 is accommodated axially inside the sleeve 28=4.

The coupling element 24=2 is generally has the axial hole 3 which has a slotted or otherwise polygonal cross-section in order to obtain a side-fit coupling with the driving or transmission shaft.

Connection means 6 of the type described above are interposed between the sleeve 28=4 and the mating element 24=2.

In this manner, the mating element 24=2 can trace a certain angle of free rotation about the main axis A with respect to the sleeve 28=4 and the other elements that constitute the assembly 20 in order to compensate for any angular offsets of the driving or transmission shaft to which it is to be connected.

Preferably, the system 1 is provided at the external fork 23 of the universal joint 22 that is designed to be coupled, in use, to the transmission shaft. However, it is not excluded that the system 1 might be incorporated in the external fork 23 of the universal joint 22 that is designed to be coupled, in use, to the driving shaft.

In the figures that follow, the reference numeral 30 designates a system of rings for the axial retention of the components of the system 1.

Figure 9:
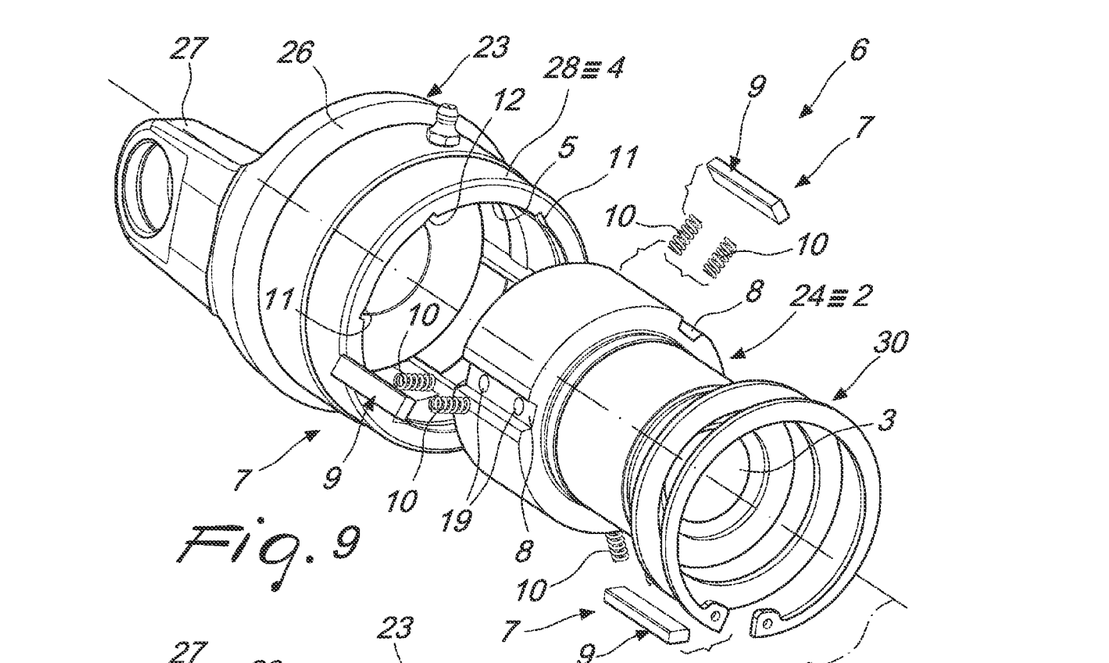
FIG. 9 is a schematic exploded perspective view of the fork of FIG. 8, comprising a connection system according to the second embodiment shown in FIGS. 2-4.

FIGS. 8 and 9 show an external fork 23 in which a system 1 according to the second embodiment described above with reference to FIGS. 2-4, i.e., provided with three functional assemblies 7 with helical springs 10, is incorporated.

Figure 10:
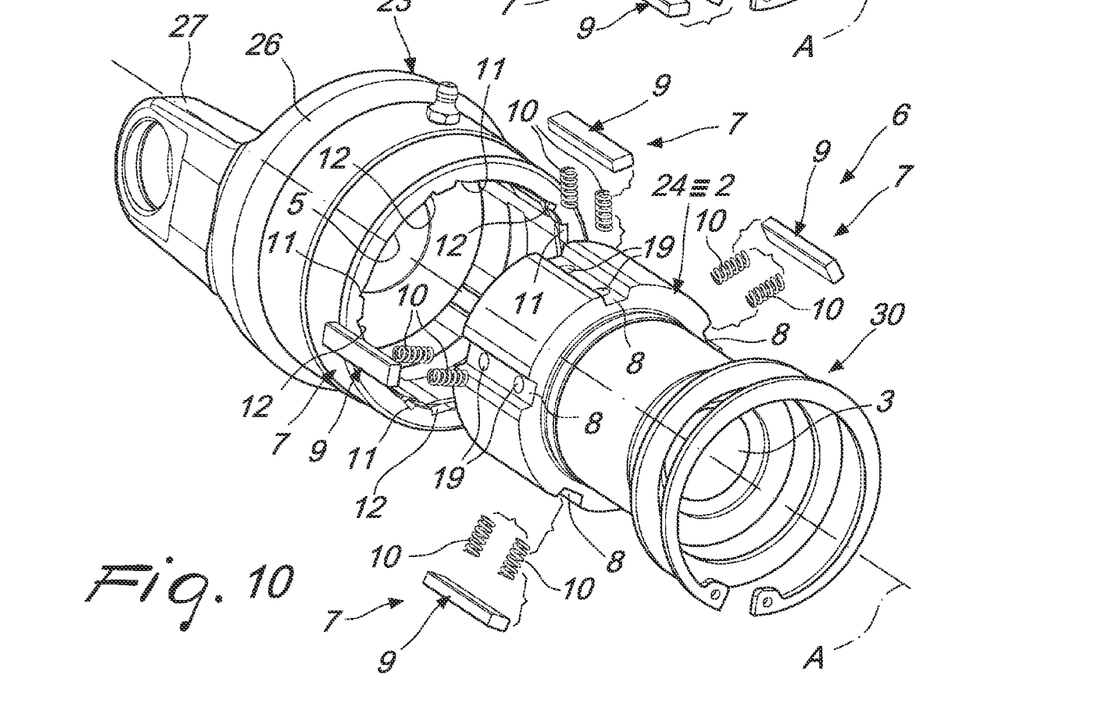
FIG. 10 is a schematic exploded perspective view of a variation of the fork of FIG. 8, comprising a connection system according to the fourth embodiment shown in FIG. 6.

FIG. 10 shows a variation of the preceding external fork 23 in which a system 1 according to the fourth embodiment described above with reference to FIG. 6, i.e., provided with five functional assemblies 7 with helical springs 10, is incorporated.

Figure 11:
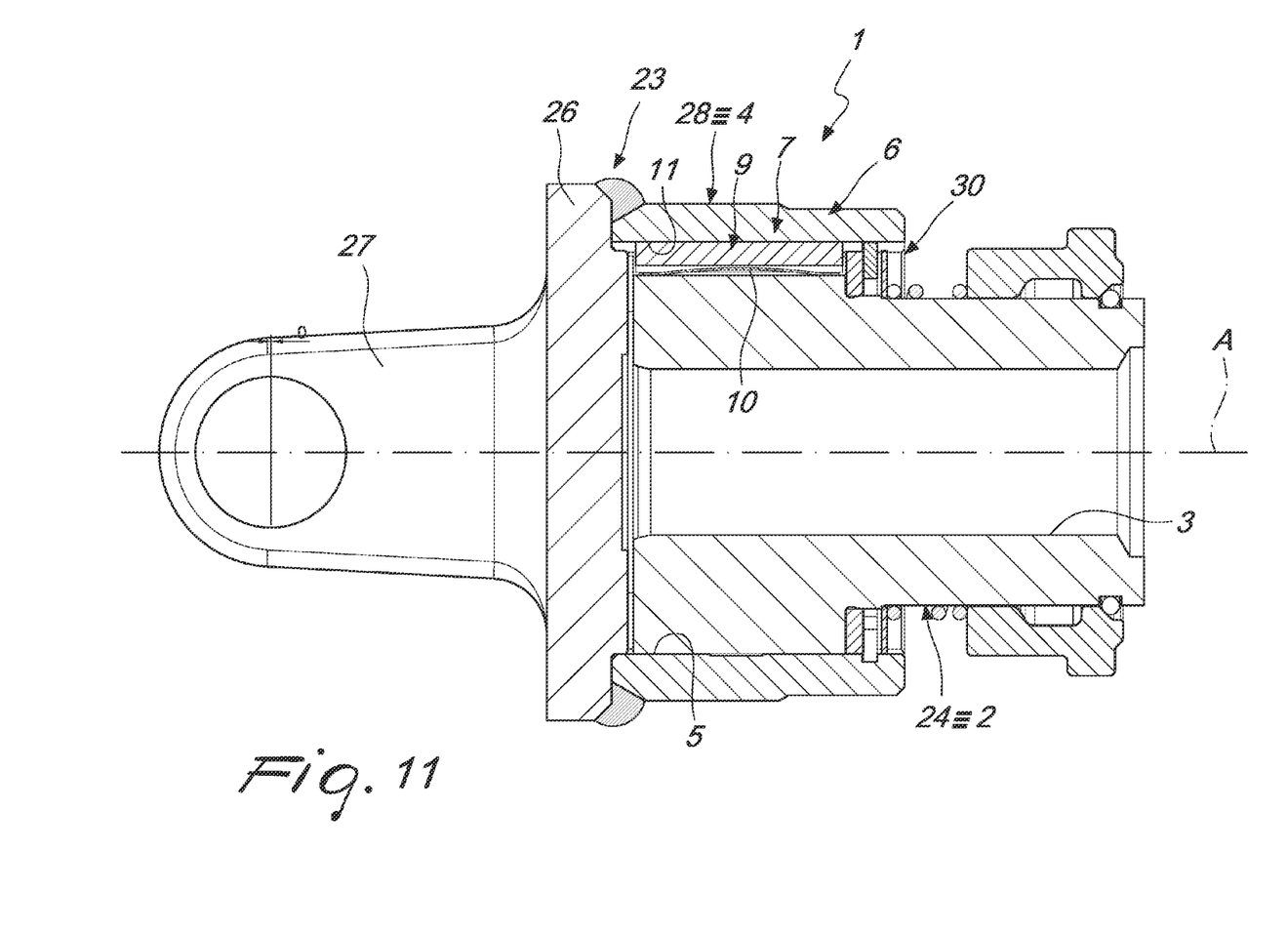
FIG. 11 is a schematic longitudinal sectional view of a further variation of the fork, comprising a connection system according to the third embodiment shown in FIG. 5.

FIG. 11 shows a further variation of the external fork 23 in which a system 1 according to the third embodiment described above with reference to FIG. 5, i.e., provided with three functional assemblies 7 with leaf springs 10, is incorporated.

Figure 12:
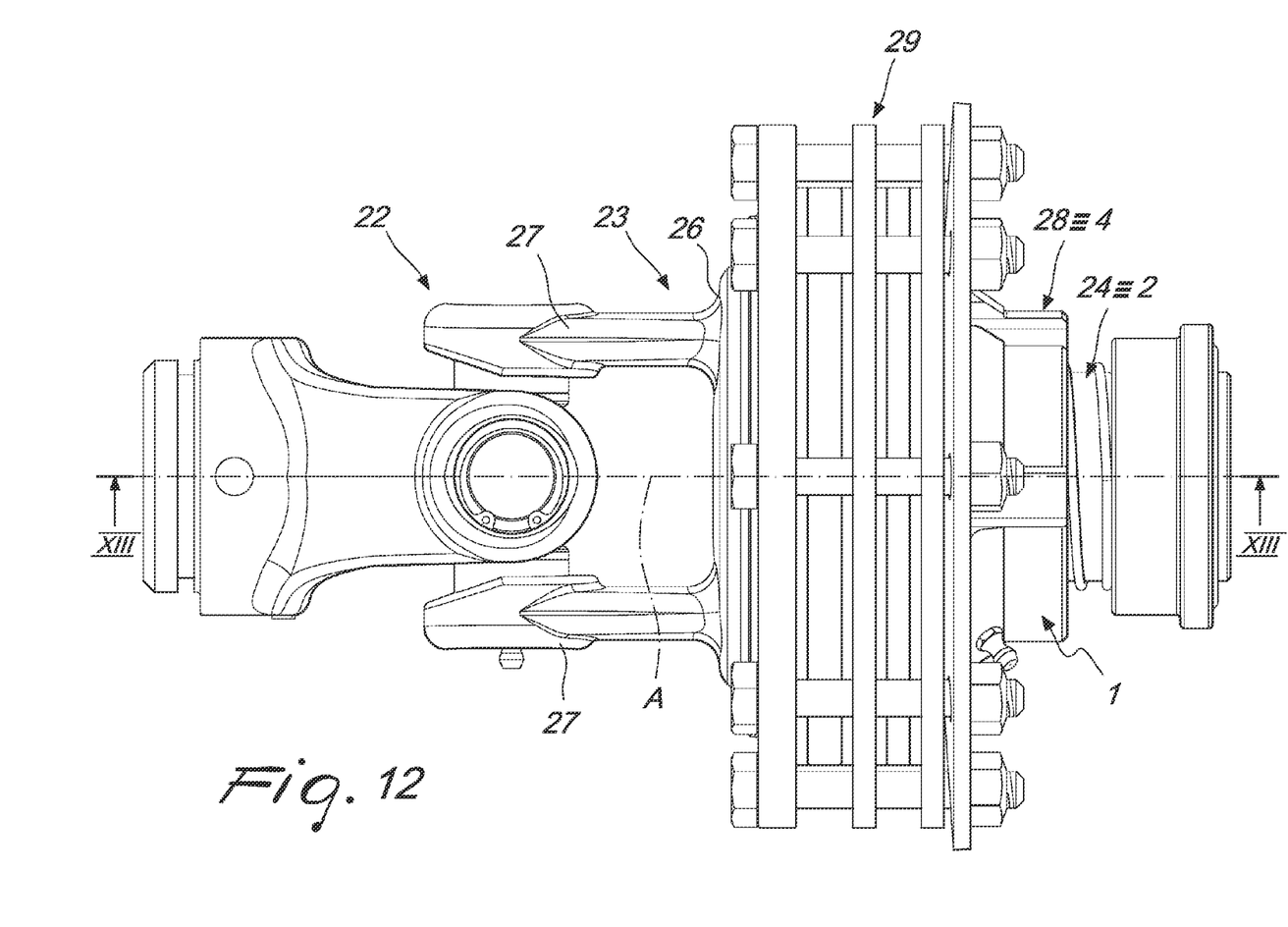
FIG. 12 is a schematic side view of an alternative embodiment of the fork comprising the system according to the invention.
Figure 13:
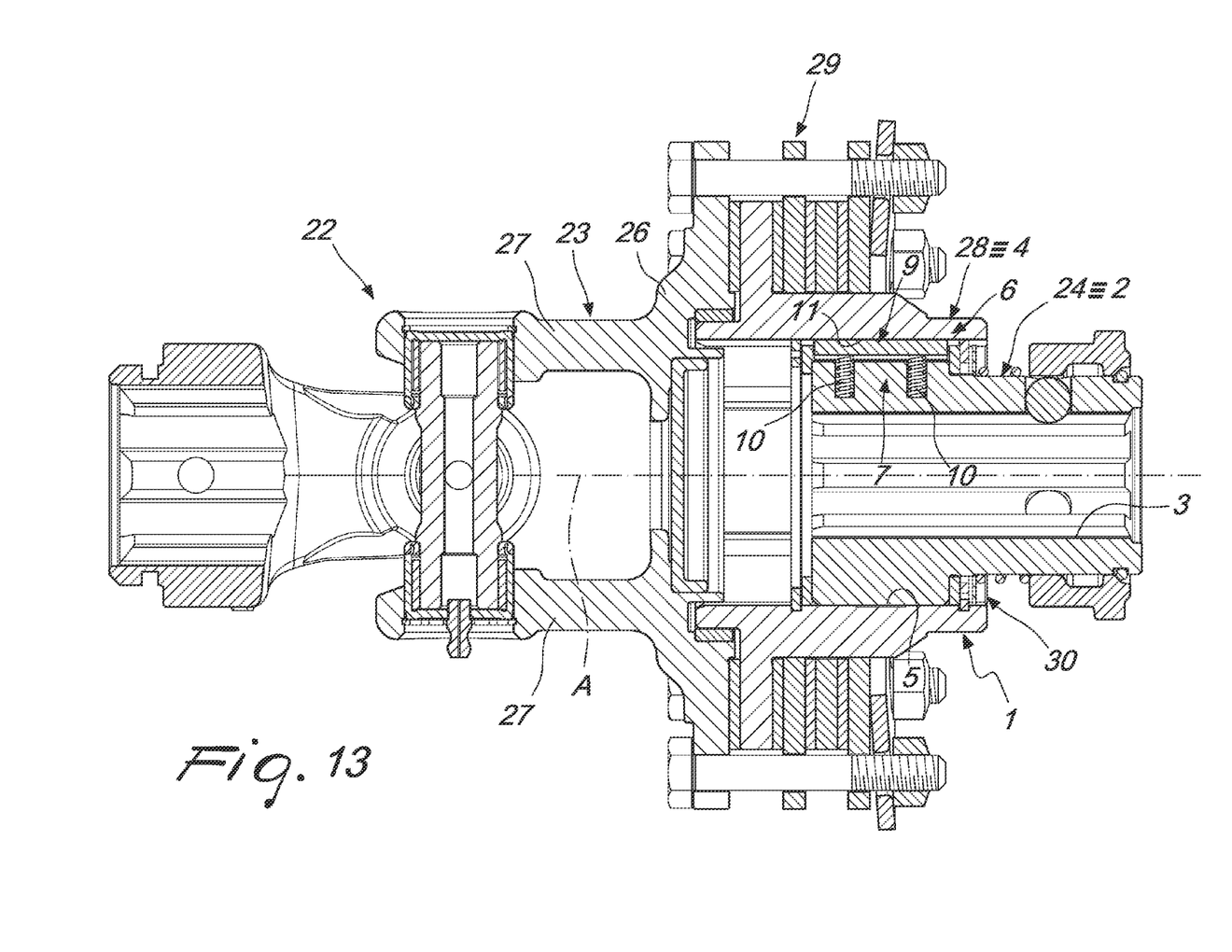
FIG. 13 is a schematic sectional view, taken along the plane XIII-XIII of FIG. 12.

FIGS. 12 and 13, finally, show an alternative embodiment of the external fork 23 which incorporates, in addition to the system 1 according to the invention, a clutch assembly 29 for limiting the transmitted torque, which is not described in detail since it is of a type that is known to the person skilled in the art. In addition to or as a replacement of the clutch assembly 29 there might be a different torque limiting system of a known type, such as an automatic limiter with detents or with a shearing pin.

In practice it has been found that the described invention achieves the intended aim and objects and in particular the fact is stressed that the system according to the invention allows to reduce the number of components used, to simplify the structure thereof and to not require particular methods for their assembly, simplifying the production and assembly cycle, reducing the risk of obtaining defective parts and containing as a whole the production costs.

Furthermore, since the coupling elements according to the invention are active for the bidirectional transmission of the driving torque, the present connection system allows to reduce transverse space occupations for an equal driving torque to be transmitted or to increase the value of the torque that can be transmitted for an equal transverse space occupation. In fact, for an equal external diameter of the shaft and internal diameter of the hub it is possible to distribute a large number of coupling elements simultaneously engaging the first or second active configuration with respect to known solutions, which provide separate groups of active tabs for the transmission of the torque in one direction or in the other.

Moreover, the system according to the invention can be incorporated easily in transmission assemblies of the type of universal shafts for farming machines.

The invention thus conceived is susceptible of numerous modifications and variations, all of which are within the scope of the appended claims.

All the details may furthermore be replaced with other technically equivalent elements.

In practice, the materials used, as well as the contingent shapes and dimensions, may be any according to the requirements without thereby abandoning the protective scope of the claims that follow.

The disclosures in Italian Patent Application No. 102019000000145 from which this application claims priority are incorporated herein by reference.

The invention claimed is:

1. A shaft-hub connection system with angular play for a bidirectional transmission of driving torque, comprising
a shaft extended along a main axis,
a hub provided with a hole inside which said shaft is at least partially accommodated and
means for connection with predefined angular play which are interposed between said hub and said shaft for the bidirectional transmission of the driving torque about said main axis and are configured to alternately assume at least one configuration for free relative rotation between the shaft and the hub about the main axis, a first active configuration for transmission of the driving torque between the shaft and the hub in a first direction about the main axis and a second active configuration for transmission of the driving torque between the shaft and the hub in a second direction, which is opposite with respect to the first one, about said axis, these configurations being angularly mutually offset about the main axis,
wherein said connection means comprise at least one functional assembly which comprises a slot associated with an outer side wall of said shaft in which a corresponding coupling element is accommodated so that it can move and is adapted to assume alternately a first position, in which the coupling element is retracted within said slot, a second position, in which the coupling element protrudes partially with respect to the slot along a first orientation, and a third position, in which the coupling element protrudes partially with respect to the slot along a second orientation, said first and second orientation being mutually offset and being offset with respect to a radial axis of said shaft, elastic compression means interposed between said slot and said coupling element for the movement of said coupling element from the first position to the second or third position, a first seat and a second seat for the abutment of said coupling element, respectively in the second and third positions which are associated inside the hole of said hub and are angularly offset about said main axis, in the first position the coupling element being completely accommodated within the slot in order to maintain a configuration for free relative rotation and in the second or third position the coupling element protruding partially from said slot in order to engage respectively the first seat in the first active configuration or in the second seat in the second active configuration.

2. The system according to claim 1, wherein said coupling element comprises a first surface that is directed toward a bottom of said slot and is delimited in a longitudinal direction by two mutually opposite edges which are substantially parallel to said main axis and wherein, at least on a plane that is substantially perpendicular to said main axis, said elastic means act on said coupling element at least at a central portion of said first surface that is comprised between said two mutually opposite edges and is spaced from said mutually opposite edges.

3. The system according to claim 2, wherein said slot has a plane of symmetry that passes through said main axis and comprises two side walls which are mutually opposite with respect to said plane and wherein said coupling element comprises a first face and a second face which are mutually opposite, each one facing a corresponding side wall of said slot, in the first or second active configuration, respectively, the first face or the second face of the coupling element being arranged so as to rest against the corresponding side wall of the slot and the second face or the first face being spaced from the corresponding side wall of said slot.

4. The system according to claim 3, wherein said first and second faces are substantially mutually parallel and said side walls mutually diverge away from said main axis.

5. The system according to claim 3, wherein said coupling element comprises a second surface that is opposite with respect to said first surface and faces said hub, the first and second surfaces being interposed between said first and second faces.

6. The system according to claim 5, wherein on a plane that is substantially perpendicular to said main axis cross-sections of said first and second seats comprise at least one respective portion for the resting of a part of the second face of said coupling element in the first active configuration and of a part of the first face of said element in the second active configuration.

7. The system according to claim 1, wherein said slot has a plane of symmetry that passes through said main axis and wherein said elastic means act on said coupling element in the first position at least proximate to said plane of symmetry.

8. The system according to claim 1, wherein said slot has a plane of symmetry that passes through said main axis and wherein said elastic means act on said coupling element in the first position at least at said plane of symmetry.

9. The system according to claim 1, wherein said coupling element comprises a body shaped like a parallelepiped.

10. The system according to claim 1, comprising at least two functional assemblies, each of which comprises a respective slot for the accommodation of a respective coupling element, respective elastic means, respective first and second abutment seats, the functional assemblies being mutually angularly offset about the main axis.

11. A universal transmission assembly comprising a transmission shaft opposite ends of which are associated with respective universal joints, each of which comprises a respective outer fork associated with an element for coupling to a driving or transfer shaft, and further comprising a system for connection according to claim 1 which is interposed between one of said outer forks and the corresponding coupling element, said hub and said shaft being respectively associated with said outer fork and with said coupling element.

* * * * *